(12) United States Patent
Kanaya

(10) Patent No.: US 8,200,875 B2
(45) Date of Patent: Jun. 12, 2012

(54) PROCESSING AND FORWARDING OF MESSAGE-SIGNALED INTERRUPTS

(75) Inventor: Hidekazu Kanaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 12/617,216

(22) Filed: Nov. 12, 2009

(65) Prior Publication Data

US 2010/0122006 A1    May 13, 2010

(30) Foreign Application Priority Data

Nov. 13, 2008    (JP) ................................. 2008-290438

(51) Int. Cl.
*G06F 13/24* (2006.01)

(52) U.S. Cl. ......... 710/260; 710/261; 710/263; 710/268

(58) Field of Classification Search ........... 710/260–269
See application file for complete search history.

(56) References Cited

U.S. PATENT DOCUMENTS

| | | | |
|---|---|---|---|
| 6,941,398 B2 * | 9/2005 | Lai et al. ....................... | 710/260 |
| 7,409,483 B2 | 8/2008 | Bennett | |
| 7,496,706 B2 * | 2/2009 | Nguyen et al. ................ | 710/269 |
| 2001/0032287 A1 | 10/2001 | Lai et al. | |
| 2005/0228923 A1 | 10/2005 | Zimmer et al. | |
| 2005/0289271 A1 | 12/2005 | Martinez et al. | |
| 2006/0015668 A1 | 1/2006 | Nguyen et al. | |
| 2006/0294277 A1 | 12/2006 | Tetrick | |

FOREIGN PATENT DOCUMENTS

| | | |
|---|---|---|
| JP | 2007-513433 | 5/2007 |
| JP | 2008-090375 | 4/2008 |

* cited by examiner

*Primary Examiner* — Raymond Phan

(74) *Attorney, Agent, or Firm* — Wolf, Greenfield & Sacks, P.C.

(57) ABSTRACT

An interrupt detection apparatus includes a detection address region storing unit configured to store an address region, as a detection address region, to be detected in accordance with a first interrupt message having address information, an issuance interrupt information storing unit configured to store address information of a second interrupt message as issuance interrupt information, an interrupt message detection unit configured to determine that the first interrupt message corresponds to the detection address region, and an interrupt issuing unit configured to issue the second interrupt message having the issuance interrupt information when it is determined that the first interrupt message corresponds to the detection address region.

5 Claims, 15 Drawing Sheets

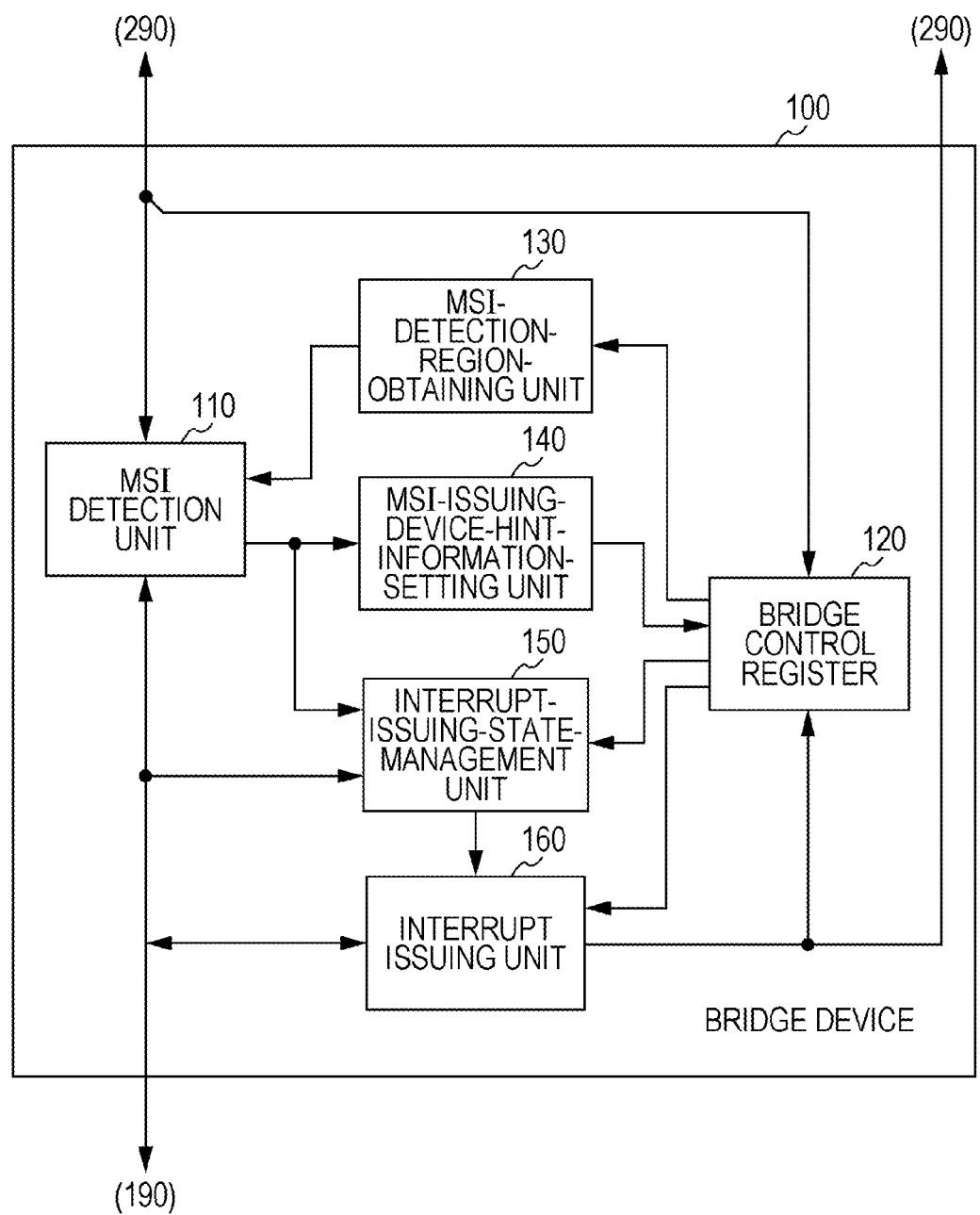

PROCESSING AND FORWARDING OF MESSAGE-SIGNALED INTERRUPTS

CROSS REFERENCE TO RELATED APPLICATIONS

The present application claims priority under 35 U.S.C. §119(a) to Japanese Patent Application JP 2008-290438, filed in the Japan Patent Office on Nov. 13, 2008, the entire content of which is hereby incorporated by reference.

BACKGROUND OF THE INVENTION

1. Field of the Invention

The present invention relates to interrupt detection apparatuses, and particularly relates to an interrupt detection apparatus which detects an interrupt message including address information and an information processing system including the interrupt detection apparatus.

2. Description of the Related Art

When a processor or the like performs a normal operation, the operation can be switched to another operation by issuing an interrupt for interrupting the normal operation. In a computer system including a PCI (Peripheral Component Interconnect) bus, as a method for transmitting a notification representing an interrupt from a PCI device to a host processor, an MSI (Message Signaled Interrupt) method has been employed. The MSI method is used for an interrupt in a message format in a transaction layer of a packet base and is realized as a writing transaction using a double word. The PCI device capable of issuing the MSI includes an MSI address register and an MSI data register which accept data written by the host processor. Before receiving an interrupt from a certain PCI device as an MSI, the host processor sets an address to which the MSI is to be transmitted and data in the MSI address register and the MSI data register, respectively, included in the PCI device. When issuing the MSI, the PCI device transmits an interrupt notification to the address set in the MSI address register by issuing a PCI write transaction used to write a value set in the MSI data register. The host processor detects information representing that the data has been written to the specified address using an interrupt controller, for example, and recognizes the interrupt notification transmitted from the PCI device. Then, the host processor executes interrupt handler processing in accordance with the received MSI.

In a system in the related art, interrupt processing using an MSI is performed by setting an MSI address as an interrupt detection region and converting an MSI corresponding to the region into an interrupt signal to be transmitted to a processor (refer to Japanese Unexamined Patent Application Publication No. 2008-90375 (FIG. 5), for example).

SUMMARY OF THE INVENTION

In the related art described above, an interrupt is issued to the processor by converting an MSI into an interrupt signal. However, when the interrupt issued to the processor is transmitted using the interrupt signal, a notification destination is limited to the processor, which lacks flexibility. Furthermore, there arises a problem in that a characteristic of an MSI including address information and a data value is not sufficiently utilized.

It is desirable to realize flexible interrupt processing by utilizing a characteristic of an interrupt in a message format.

According to an embodiment of the present invention, there is provided an interrupt detection apparatus and an information processing system including the interrupt detection apparatus, the interrupt detection apparatus including a detection address region storing unit configured to store an address region, as a detection address region, to be detected in accordance with a first interrupt message having address information, an issuance interrupt information storing unit configured to store address information of a second interrupt message as issuance interrupt information, an interrupt message detection unit configured to determine that the first interrupt message corresponds to the detection address region, and an interrupt issuing unit configured to issue the second interrupt message having the issuance interrupt information when it is determined that the first interrupt message corresponds to the detection address region. Accordingly, in response to the detection of the first interrupt message corresponding to the detection address region, the second interrupt message is issued.

The issuance interrupt information storing unit may store a plurality of issuance interrupt information items, and the interrupt issuing unit may issue a plurality of second interrupt messages in accordance with the plurality of issuance interrupt information items. Accordingly, in response to the detection of the first interrupt message corresponding to the detection address region, a plurality of second interrupt messages are issued.

According to another embodiment of the present invention, there is provided an interrupt detection apparatus and an information processing system including the interrupt detection apparatus, the interrupt detection apparatus including a detection address region storing unit configured to store an address region, as a detection address region, to be detected in accordance with a first interrupt message having address information and data information, an issuance interrupt information storing unit configured to store address information and data information of a second interrupt message as issuance interrupt information, an interrupt message detection unit configured to determine that the first interrupt message corresponds to the detection address region, an interrupt type storing unit configured to store the second interrupt message or a processor interrupt signal issued to a processor as a type of an interrupt to be issued, and an interrupt issuing unit configured to issue, when it is determined that the first interrupt message corresponds to the detection address region and when the type stored in the interrupt type storing unit corresponds to the second interrupt message, the second interrupt message having the issuance address information, and configured to issue, when it is determined that the first interrupt message corresponds to the detection address region and when the type stored in the interrupt type storing unit corresponds to the processor interrupt signal, the processor interrupt signal to the processor. Accordingly, in response to the detection of the first interrupt message corresponding to the detection address region, the second interrupt message or the processor interrupt signal is issued to the processor in accordance with the type of the interrupt stored in the interrupt type storing unit.

According to a further embodiment of the present invention, there is provided an information processing system including at least one processor system having a processor and a memory, at least one peripheral device, and a plurality of bridge devices which are connected to one another in serial or in parallel between the processor system and the peripheral device. The bridge device includes a detection address region storing unit configured to store an address region, as a detection address region, to be detected in accordance with a first interrupt message having address information transmitted from the peripheral device, an issuance interrupt information storing unit configured to store address information included in a second interrupt message as issuance interrupt information, an interrupt message detection unit configured to determine that the first interrupt message corresponds to the detection address region, and an interrupt issuance unit configured to issue the second interrupt message having the issuance interrupt information to the processor system or the peripheral device when it is determined that the first interrupt message corresponds to the detection address region. Accordingly, when one of the bridge devices detects the first interrupt message corresponding to the detection address region, second interrupt messages are issued in a chain-reaction manner.

According to the present invention, interrupt processing is flexibly performed making use of a characteristic of an interrupt in a message format.

BRIEF DESCRIPTION OF THE DRAWINGS

FIG. 4 is a diagram illustrating a configuration example of a bridge device according to the first embodiment of the present invention;

DESCRIPTION OF THE PREFERRED EMBODIMENTS

Best modes (hereinafter referred to as "embodiments") for carrying out the present invention will be described hereinafter. The description is made as below.

Figure 1:
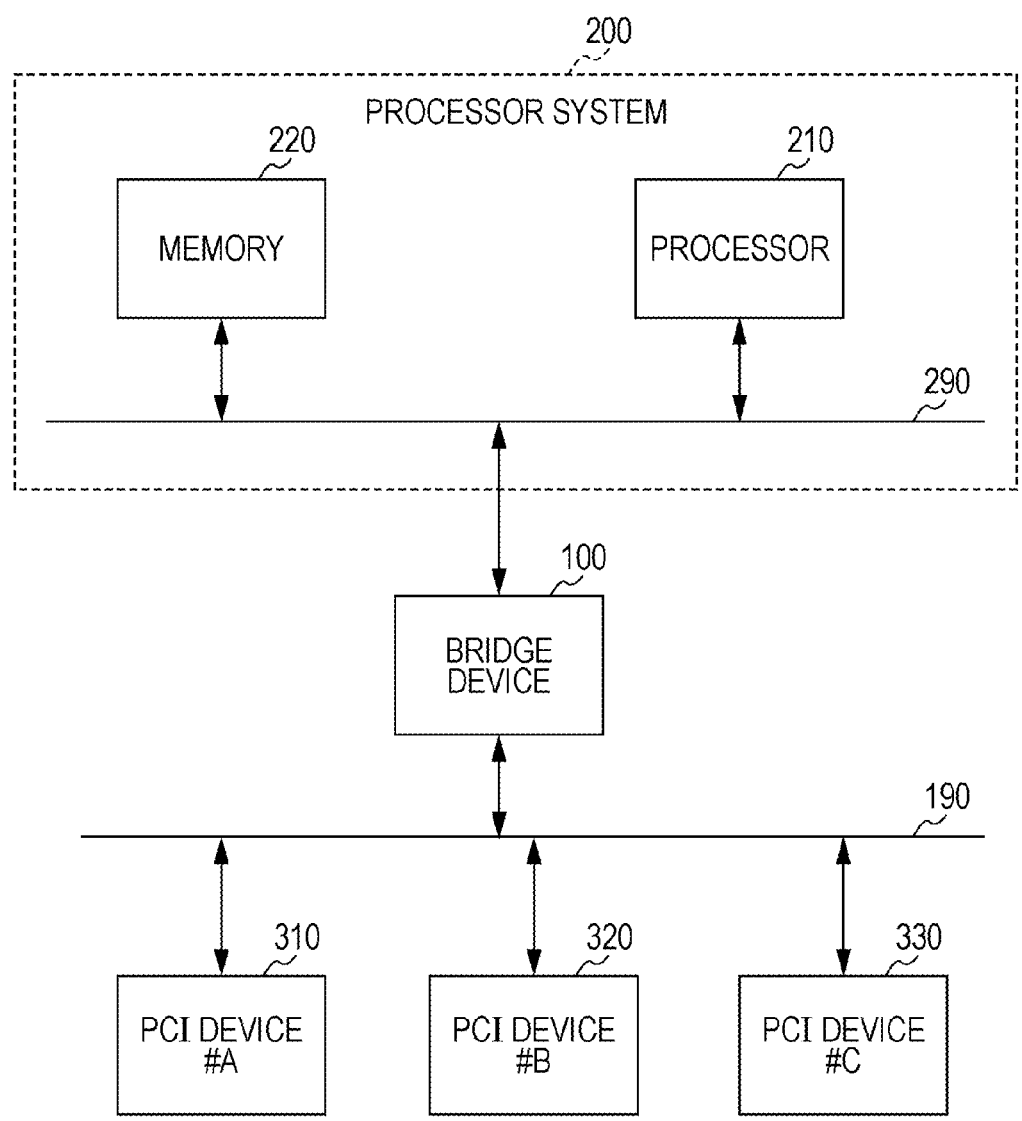
FIG. 1 is a diagram illustrating a configuration example of an information processing system according to a first embodiment of the present invention.

1. First Embodiment (an example of an information processing system including a single bridge device)
2. Second Embodiment (an example of an information processing system including a plurality of bridge devices)
1. First Embodiment
Example of Information Processing System Including Single Bridge Device FIG. 1 is a diagram illustrating a configuration example of an information processing system according to a first embodiment of the present invention. The information processing system includes a bridge device 100, a processor system 200, and PCI (Peripheral Component Interconnect) devices 310 to 330.

The bridge device 100 is connected between a processor bus 290 included in the processor system 200 and a PCI bus 190 located near the PCI devices 310 to 330, and enables mutual communication therebetween by changing a packet format and an electric characteristic. The bridge device 100 detects an interrupt in a message format transmitted through the bridge device 100 to thereby generate an interrupt in a new message format or a processor interrupt.

The processor system 200 includes a processor 210 and a memory 220 which are connected to each other through the processor bus 290. The processor 210 performs processing as processing of the processor system 200. The memory 220 stores programs and data used for the processing performed by the processor 210.

The PCI devices 310 to 330 function as peripheral devices of the processor system 200, and are realized as various input/output devices and a DMA (Direct Memory Access) controller, for example. Note that, although the three PCI devices 310 to 330 are shown in this embodiment, the present invention is not limited to this, and an arbitrary number of PCI devices may be connected to the PCI bus 190. An arbitrary number of PCI devices are collectively referred to as a PCI device 300.

Figure 2:
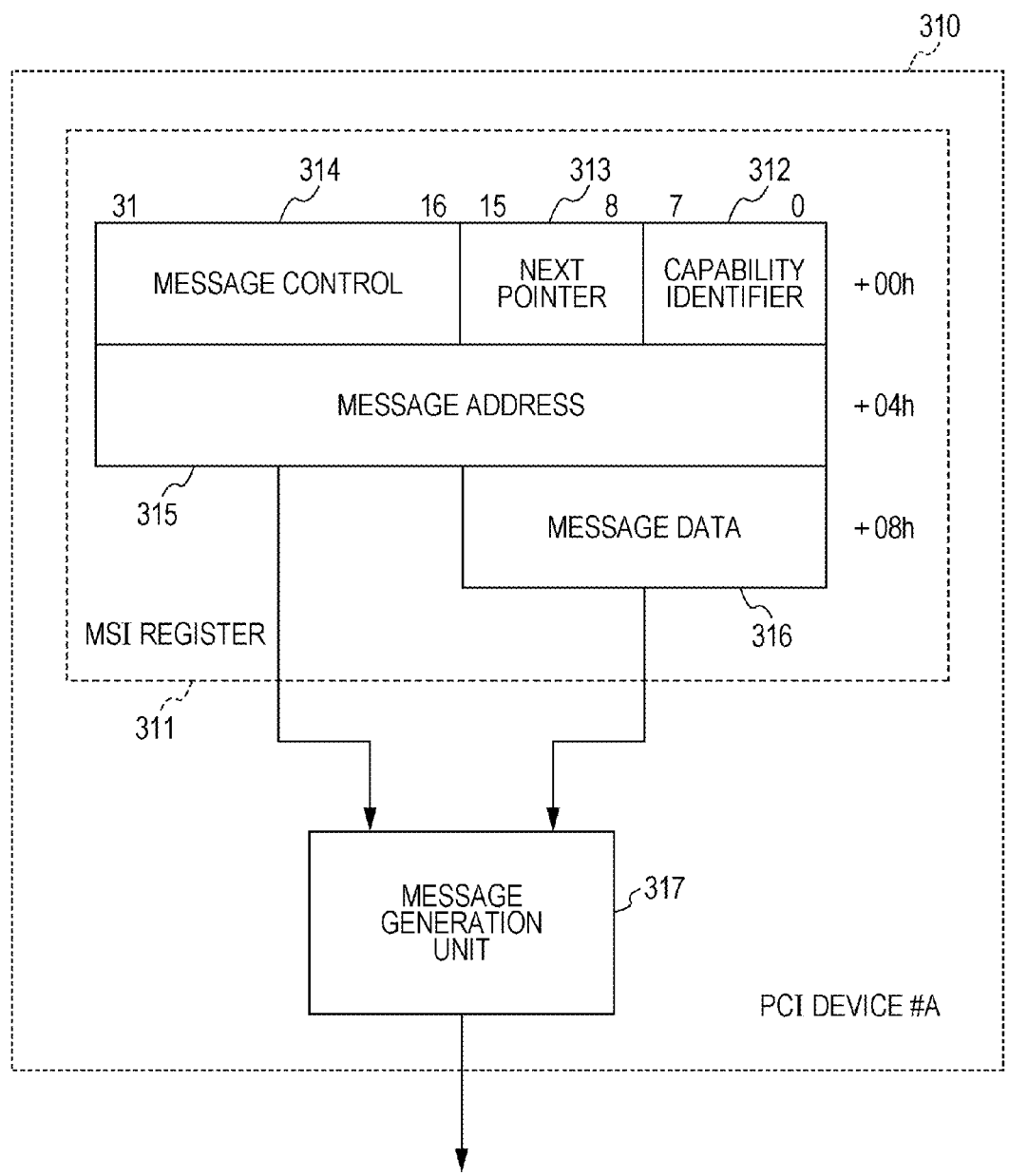
FIG. 2 is a diagram illustrating an example of a message generation mechanism included in a PCI device according to the first embodiment of the present invention.

FIG. 2 is a diagram illustrating an example of a message generation mechanism included in the PCI device 300 according to the first embodiment of the present invention. The PCI device 300 generates an interrupt in a message format (MSI: Message Signaled Interrupt) specified by the PCI. The PCI device 300 includes an MSI register 311 and a message generation unit 317.

The MSI register 311 stores information used to issue an MSI from the PCI device 300. The MSI register 311 is referred to as an MSI capability structure in the PCI specification. The MSI register 311 includes a capability identifier 312, a next pointer 313, a message control 314, a message address 315, and message data 316.

The capability identifier (Capability ID) 312 corresponds to a register which stores an identifier representing a function of a message. In the case of an MSI, "05h" ("h" represents that a number immediately before "h" is a hexadecimal number. Hereinafter the same shall apply.) is assigned to the capability identifier 312.

The next pointer 313 corresponds to a register which stores a pointer to the next item. In a case of the last item, "NULL" representing blank is assigned to the next pointer 313.

The message control 314 corresponds to a register which stores control information to be supplied to system software. The message control 314 includes information representing presence or absence of 64-bit addressing and control information in association with a multiple message.

The message address 315 corresponds to a register which stores address information of the MSI. Specifically, the message address 315 stores an address of a destination of an MSI issued by the PCI device 300. Note that, although the message address 315 has a width of 32 bits herein since 32-bit addressing is employed, 64-bit addressing may be employed depending on a system. In this case, the message address 315 has a width of 64 bits.

The message data 316 corresponds to a register which stores a data value of the MSI. Specifically, the message data 316 stores a data value such as a device identifier of the PCI device 300, for example.

The message generation unit 317 generates an MSI message using the address information stored in the message address 315 and the data value stored in the message data 316.

MSIs generated using the PCI device 300 are supplied to the PCI bus 190, and further supplied to the processor bus 290 through the bridge device 100. The bridge device 100 monitors the address information of the MSIs and detects an MSI corresponding to a predetermined address region (hereinafter referred to as a "detection address region").

Figure 3A:
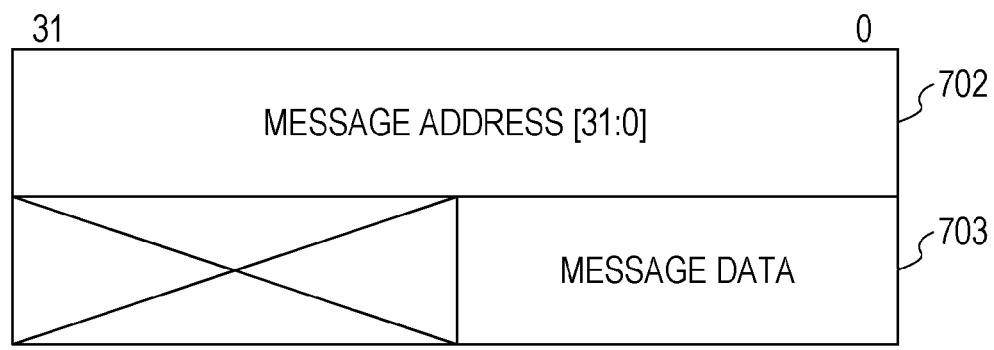
FIGS. 3A and 3B are diagrams illustrating image examples of an MSI message in a PCI bus.
Figure 3B:
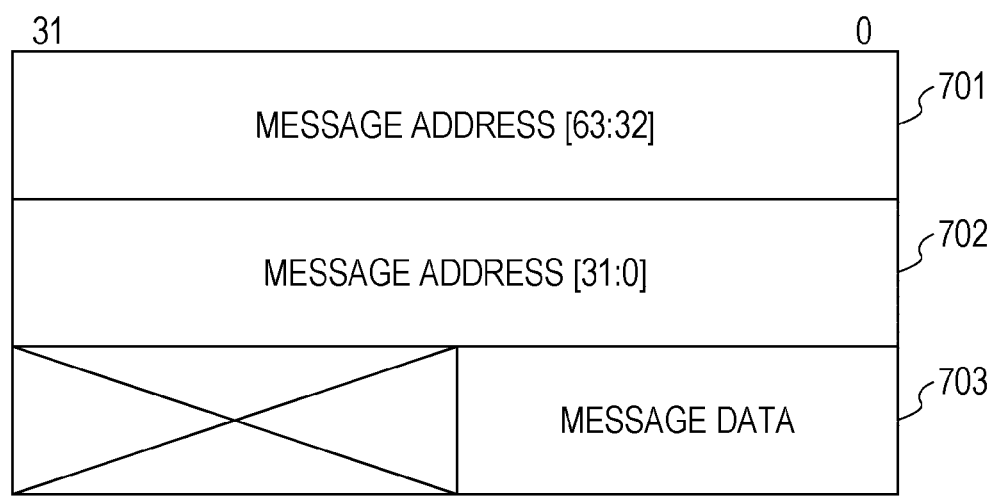

FIGS. 3A and 3B are diagrams illustrating image examples of an MSI message in the PCI bus 190. The MSI message is transmitted through a signal line referred to as an AD (Address and Data) signal line by 32 bits per cycle in the PCI bus 190, for example.

FIG. 3A shows an example of a case of the 32-bit addressing. In an address phase, a message address 702 of 32 bits of an MSI is transmitted. Then, in a data phase, a message data 703 of 16 bits of the MSI is transmitted.

FIG. 3B shows an example of a case of 64-bit addressing. First, in a first address phase, a message address 701 of 32 bits (the 32nd bit to the 63rd bit) on an MSB (Most Significant Bit) side of an MSI is transmitted. Then, in a second address phase, a message address 702 of 32 bits (the 0th bit to the 31st bit) on an LSB (Least Significant Bit) side of the MSI is transmitted. Then, in a data phase, a message data 703 of 16 bits of the MSI is transmitted.

FIG. 4 is a diagram illustrating a configuration example of the bridge device 100 according to the first embodiment of the present invention. The bridge device 100 includes an MSI detection unit 110, a bridge control register 120, an MSI-detection-region-obtaining unit 130, an MSI-issuing-device-hint-information-setting unit 140, an interrupt-issuing-state-management unit 150, and an interrupt issuing unit 160.

The MSI detection unit 110 monitors message addresses 702 (or message addresses 701) of MSIs transmitted from the PCI bus 190 to the processor bus 290 and detects an MSI corresponding to a detection address region.

The bridge control register 120 stores information used for control of the bridge device 100. Specifically, the bridge control register 120 stores an address region to be detected by the MSI detection unit 110 and address information and data values of MSIs issued by the interrupt issuing unit 160. The bridge control register 120 will be described in detail with reference to FIG. 5 hereinafter.

The MSI-detection-region-obtaining unit 130 obtains information on an address region to be detected by the MSI detection unit 110 from the bridge control register 120 and supplies the information to the MSI detection unit 110.

The MSI-issuing-device-hint-information-setting unit 140 sets, to the bridge control register 120, hint information used to identify a PCI device 300 which issued an MSI detected by the MSI detection unit. The hint information includes the device identifier stored in the message data 703, for example.

The interrupt-issuing-state-management unit 150 manages a state of issuance of an interrupt issued to the processor 210. When an MSI corresponding to the detection address region is detected, the interrupt-issuing-state-management unit 150 specifies a type of an interrupt to be issued. When it is determined that the interrupt is issued to the processor 210, an operation in accordance with the state of the interrupt which has issued to the processor 210 is performed. Specifically, when interrupt processing is in progress in the processor 210, the interrupt-issuing-state-management unit 150 waits until a notification of completion of the interrupt processing is transmitted thereto. On the other hand, when the interrupt processing is not in progress in the processor 210, the interrupt-issuing-state-management unit 150 instructs the interrupt issuing unit 160 to issue an interrupt to the processor 210 after determining that an appropriate MSI has been written in the memory 220.

The interrupt issuing unit 160 issues an MSI or a processor interrupt in accordance with an instruction issued by the interrupt-issuing-state-management unit 150. When an MSI is issued, the MSI is supplied to the PCI bus 190 or the processor bus 290 in accordance with address information of the MSI. When a processor interrupt is issued, it is assumed that the interrupt is issued through the processor bus 290. However, the interrupt may be issued through an interrupt dedicated line for the processor bus 290.

Figure 5:
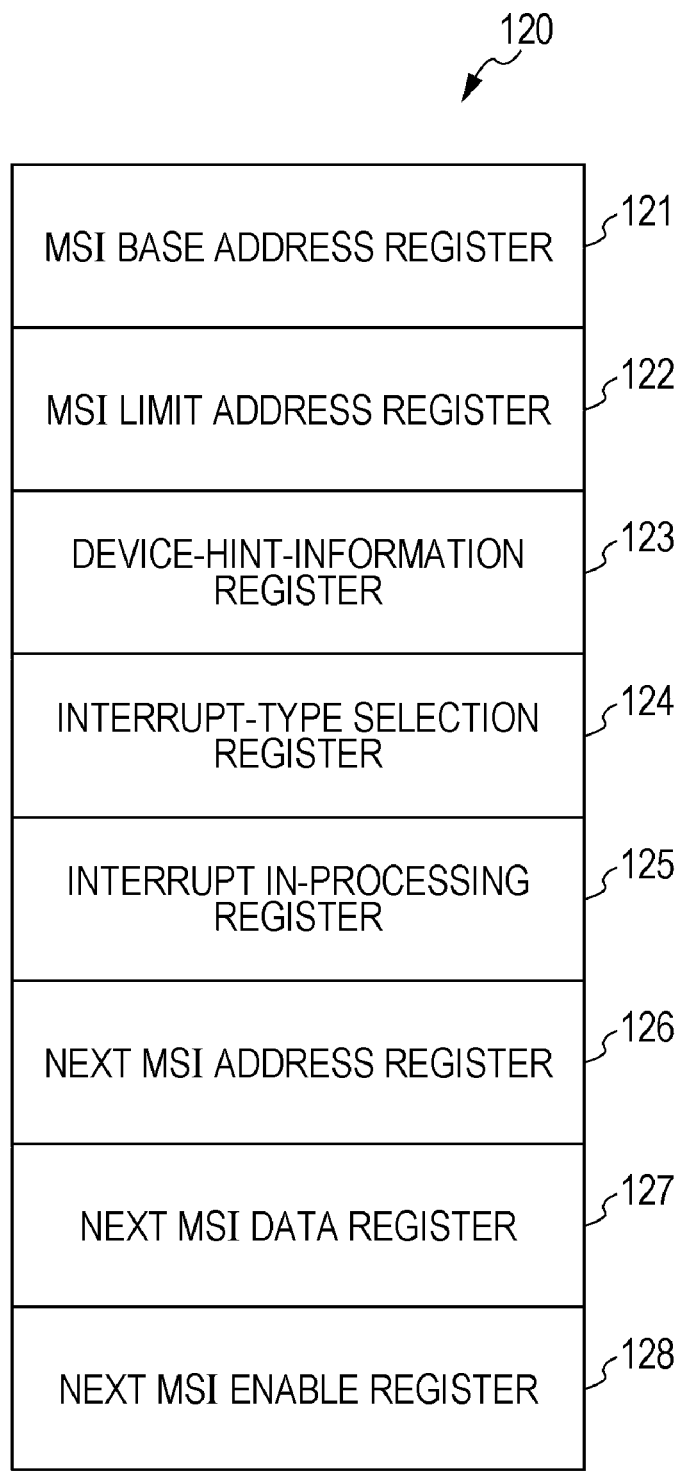
FIG. 5 is a diagram illustrating a configuration example of a bridge control register according to the first embodiment of the present invention.

FIG. 5 is a diagram illustrating a configuration example of the bridge control register 120 according to the first embodiment of the present invention. The bridge control register 120 includes an MSI base address register 121, an MSI limit address register 122, a device-hint-information register 123, an interrupt-type-selection register 124, an interrupt in-processing register 125, a next MSI address register 126, a next MSI data register 127, and a next MSI enable register 128.

The MSI base address register 121 stores a base address serving as a leading address of an address region to be detected by the MSI detection unit 110. The MSI limit address register 122 stores a limit address serving as a trailing address of the address region to be detected by the MSI detection unit 110. That is, the detection address region is defined by the MSI base address register 121 and the MSI limit address register 122. The MSI-detection-region-obtaining unit 130 obtains address information and a data value from the MSI base address register 121 and the MSI limit address register 122, respectively, and supplies the address information and the data value to the MSI detection unit 110.

The device-hint-information register 123 stores hint information used to identify a PCI device 300 which issued an MSI detected by the MSI detection unit 110. The device-hint-information register 123 is set by the MSI-issuing-device-hint-information-setting unit 140 and is referred to by the processor 210, for example. The processor 210 can reduce burden of a searching operation using the hint information when identifying the PCI device 300 which issued the MSI serving as a trigger of an interrupt received by the processor 210.

The interrupt-type-selection register 124 stores an MSI or an interrupt which has been selected as a type of an interrupt issued by the interrupt issuing unit 160. The interrupt-issuing-state-management unit 150 and the interrupt issuing unit 160 perform operations in accordance with content stored in the interrupt-type-selection register 124. That is, in a case where it is determined that the interrupt is issued to the processor 210 and another interrupt which has been issued to the processor 210 is being processed, the interrupt-issuing-state-management unit 150 waits until a notification of completion of the interrupt processing is transmitted thereto. On the other hand, when any interrupt processing is not in progress in the processor 210, the interrupt-issuing-state-management unit 150 instructs the interrupt issuing unit 160 to issue an interrupt to the processor 210 after determining that an appropriate MSI has been written in the memory 220. The interrupt issuing unit 160 issues an MSI or a processor interrupt in accordance with content stored in the interrupt-type-selection register 124.

The interrupt in-processing register 125 stores information representing whether an interrupt is being issued to the processor 210. When the interrupt issuing unit 160 issues an interrupt to the processor 210, information representing "in process" is set in the interrupt in-processing register 125, and when a notification of a completion of interrupt processing is transmitted from the processor 210, information representing "not in process" is set in the interrupt in-processing register 125. The interrupt-issuing-state-management unit 150 refers to the interrupt in-processing register 125 and waits until the notification of completion of the interrupt processing is transmitted thereto in a case where interrupt processing is being performed when an interrupt is issued to the processor 210.

The next MSI address register 126 stores address information of an MSI issued by the interrupt issuing unit 160. The next MSI data register 127 stores a data value of an MSI issued by the interrupt issuing unit 160. The next MSI enable register 128 stores information representing whether the interrupt issuing unit 160 is allowed to issue an MSI. The interrupt issuing unit 160 issues a next MSI in accordance with the next MSI address register 126, the next MSI data register 127, and the next MSI enable register 128.

Figure 6:
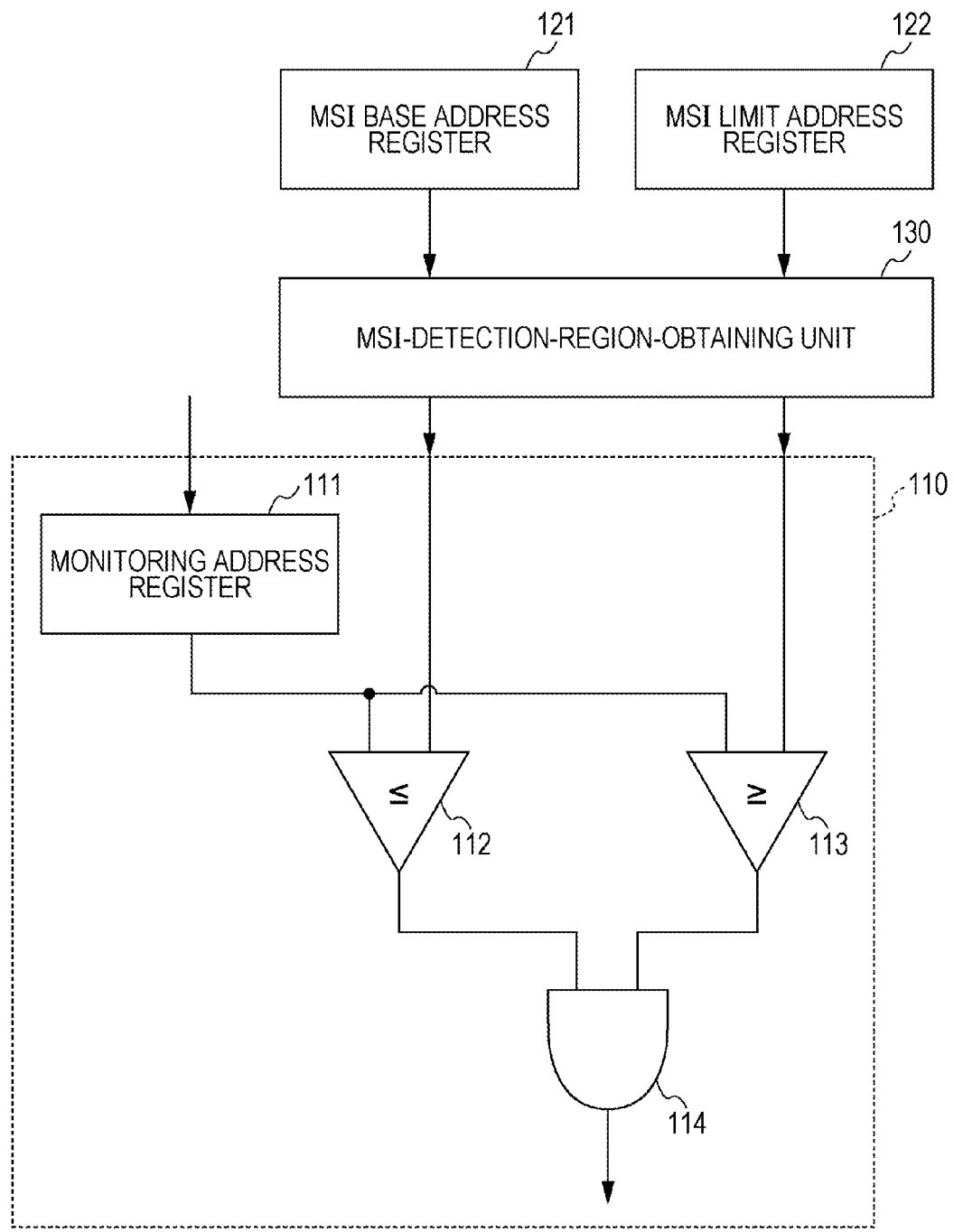
FIG. 6 is a diagram illustrating a configuration example of an MSI detection unit according to the first embodiment of the present invention.

FIG. 6 is a diagram illustrating a configuration example of the MSI detection unit 110 according to the first embodiment of the present invention. The MSI detection unit 110 includes a monitoring address register 111, comparators 112 and 113, and a logic operation unit 114.

The monitoring address register 111 monitors the message address 702 (or the message address 701) of an MSI transmitted from the PCI bus 190 to the processor bus 290 and stores the message address 702 (or the message address 701) as a monitoring address. The monitoring address stored in the monitoring address register 111 is supplied to the comparators 112 and 113.

The comparators 112 and 113 determine whether a monitoring address stored in the monitoring address register 111 corresponds to a detection address region.

The comparator 112 compares a monitoring address stored in the monitoring address register 111 with a base address obtained from the MSI base address register 121. When it is determined that the monitoring address is equal to or larger than the base address, a logic state "true" is output, and otherwise a logic state "false" is output. The comparator 113 compares the monitoring address stored in the monitoring address register 111 with the limit address obtained from the MSI limit address register 122. When it is determined that the monitoring address is equal to or smaller than the limit address, a logic state "true" is output, and otherwise a logic state "false" is output.

The logic operation unit 114 generates a logical multiply (AND) using results output from the comparators 112 and 113. Therefore, when the monitoring address stored in the monitoring address register 111 is equal to or larger than the base address and equal to or smaller than the limit address, an MSI corresponding to a detection address region is detected.

Figure 7:
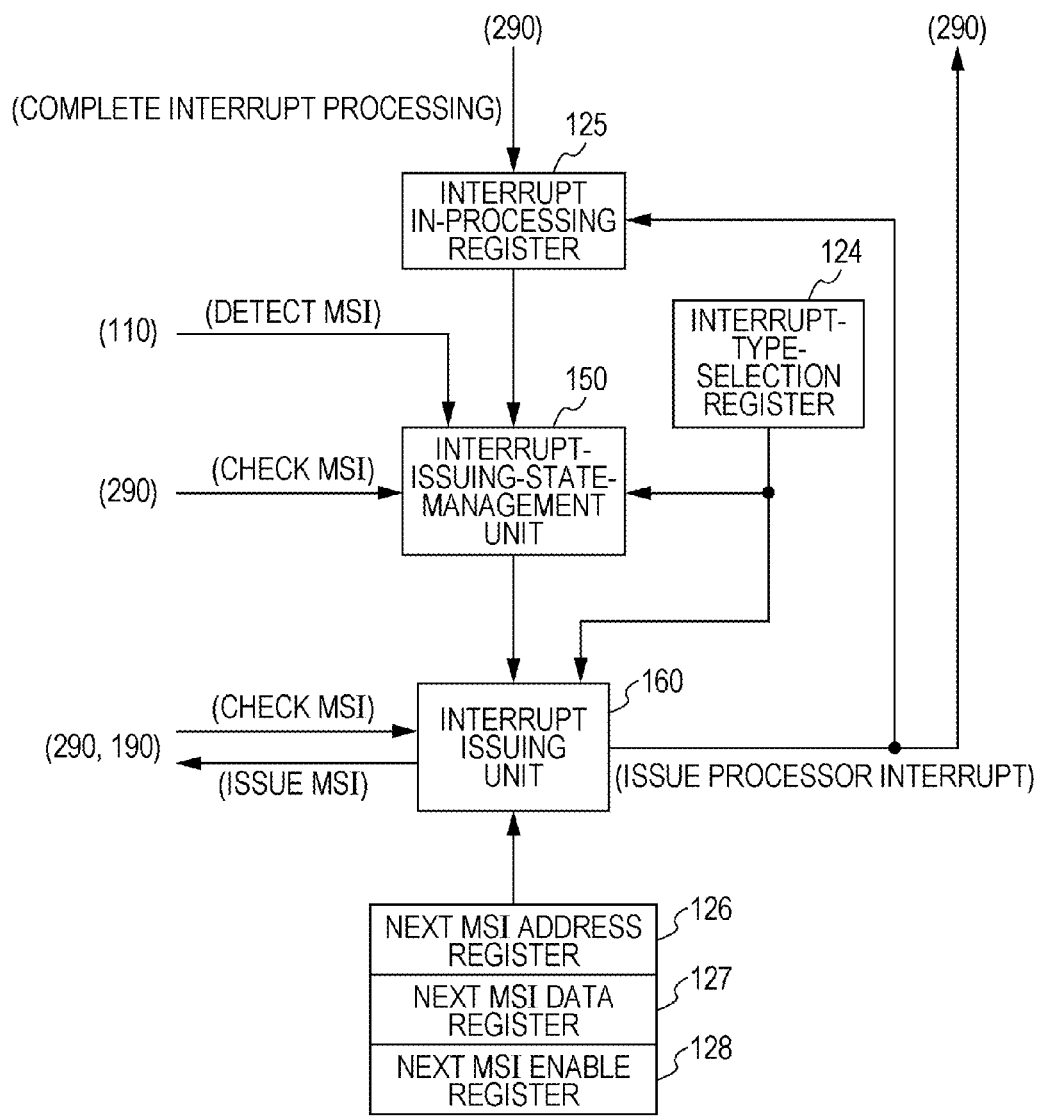
FIG. 7 is a diagram illustrating a configuration example of a region including an interrupt issuing state management unit and an interruption issuing unit according to the first embodiment of the present invention.

FIG. 7 is a diagram illustrating a configuration example of a region including an interrupt-issuing-state-management unit 150 and an interrupt issuing unit 160 according to the first embodiment of the present invention.

Content of the interrupt-type-selection register 124 and content of the interrupt in-processing register 125 are supplied to the interrupt-issuing-state-management unit 150. The content of the interrupt-type-selection register 124, content of the next MSI address register 126, content of the next MSI data register 127, and content of the next MSI enable register 128 are supplied to the interrupt issuing unit 160.

When the MSI detection unit 110 detects an MSI corresponding to a detection address region, the interrupt-issuing-state-management unit 150 refers to the content of the interrupt-type-selection register 124. When the content of the interrupt-type-selection register 124 represents the MSI, the interrupt-issuing-state-management unit 150 instructs the interrupt issuing unit 160 to issue the MSI. On the other hand, when the content of the interrupt-type-selection register 124 represents a processor interrupt, the interrupt-issuing-state-management unit 150 further refers to the content of the interrupt in-processing register 125. As a result, if the processor 210 is performing interrupt processing, the interrupt-issuing-state-management unit 150 waits until a notification of completion of the interrupt processing is transmitted thereto. On the other hand, if the processor 210 is not performing interrupt processing, the interrupt-issuing-state-management unit 150 confirms that an appropriate MSI has been written in the memory 220 and instructs the interrupt issuing unit 160 to issue an interrupt to the processor 210.

The interrupt issuing unit 160 issues an MSI or a processor interrupt depending on the content of the interrupt-type-selection register 124 in accordance with an instruction issued by the interrupt-issuing-state-management unit 150. When an MSI is to be issued, the interrupt issuing unit 160 refers to the next MSI enable register 128, and if the next MSI enable register 128 represents that the MSI can be issued, the interrupt issuing unit 160 issues the MSI in accordance with the next MSI address register 126 and the next MSI data register 127. On the other hand, when a processor interrupt is to be issued, the interrupt in-processing register 125 is set to be "in process", and the interrupt issuing unit 160 issues an interrupt to the processor 210.

Note that when address information of the MSI issued by the interrupt issuing unit 160 corresponds to the address region of the MSI detection unit 110, the MSI also serve as an object of detection performed by the MSI detection unit 110, and therefore, an infinite loop is entered. In order to avoid the infinite loop, the next MSI address register 126 is set so as not to correspond to the detection address region of the MSI detection unit 110 or the content of the next MSI address register 126 is excepted from the detection address region.

Figure 8:
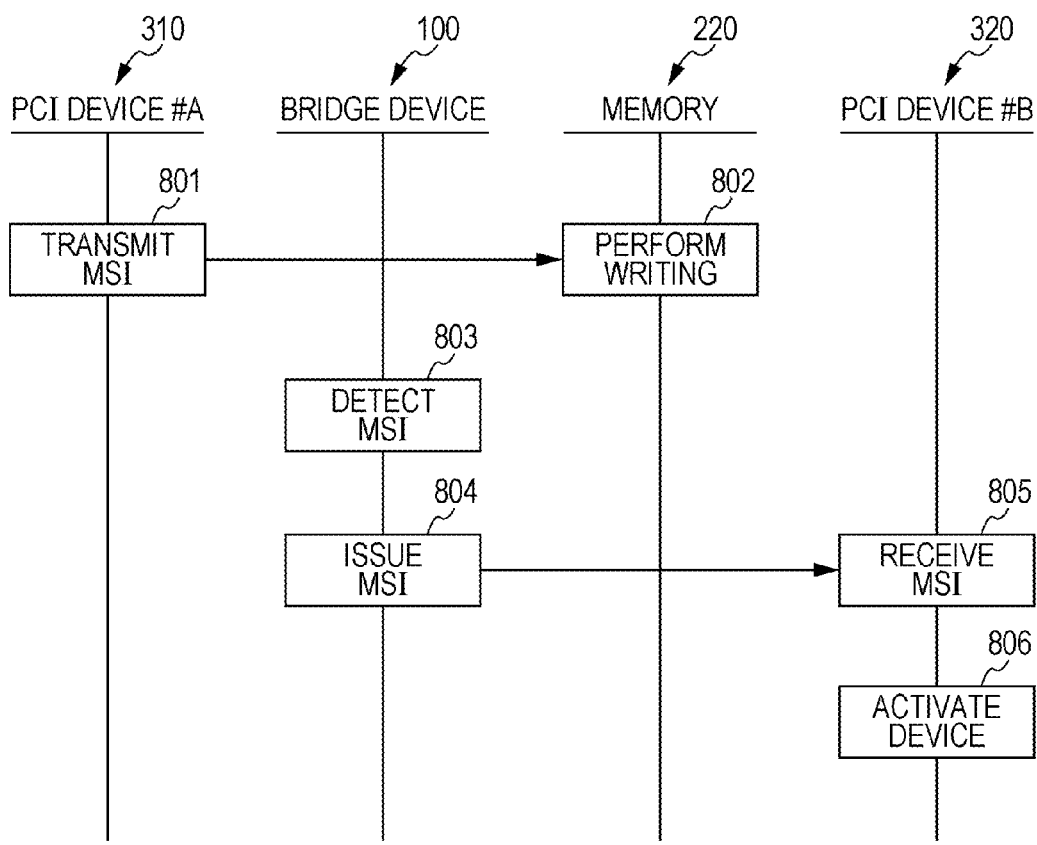
FIG. 8 is a diagram illustrating an example of MSI issuance performed in the information processing system according to the first embodiment of the present invention.

Operation Example of Information Processing System Including Single Bridge Device FIG. 8 is a diagram illustrating an example of MSI issuance performed in the information processing system according to the first embodiment of the present invention. Here, it is assumed that "MSI" has been set in the interrupt-type-selection register 124.

The PCI device #A 310 transmits an MSI (801) through the PCI bus 190 and the processor bus 290 to the memory 220 where content of the MSI is written (802). The MSI detection unit 110 of the bridge device 100 monitors address information of messages transmitted between the PCI bus 190 and the processor bus 290. Then, the bridge device 100 detects an MSI corresponding to an address region specified by the MSI base address register 121 and the MSI limit address register 122 (803).

Since "MSI" is set in the interrupt-type-selection register 124, the interrupt-issuing-state-management unit 150 of the bridge device 100 instructs the interrupt issuing unit 160 to issue an MSI. By this, the interrupt issuing unit 160 of the bridge device 100 issues the MSI (804). Here, the content of the next MSI address register 126 is set in the message address 702 (or the message address 701), and the content of the next MSI data register 127 is set in the message data 703.

When an address of the next MSI address register 126 indicates the PCI device #B 320, the PCI device #B 320 receives the MSI (805). In response to the reception of the MSI, the PCI device #B 320 performs activation processing, for example (806).

Figure 9:
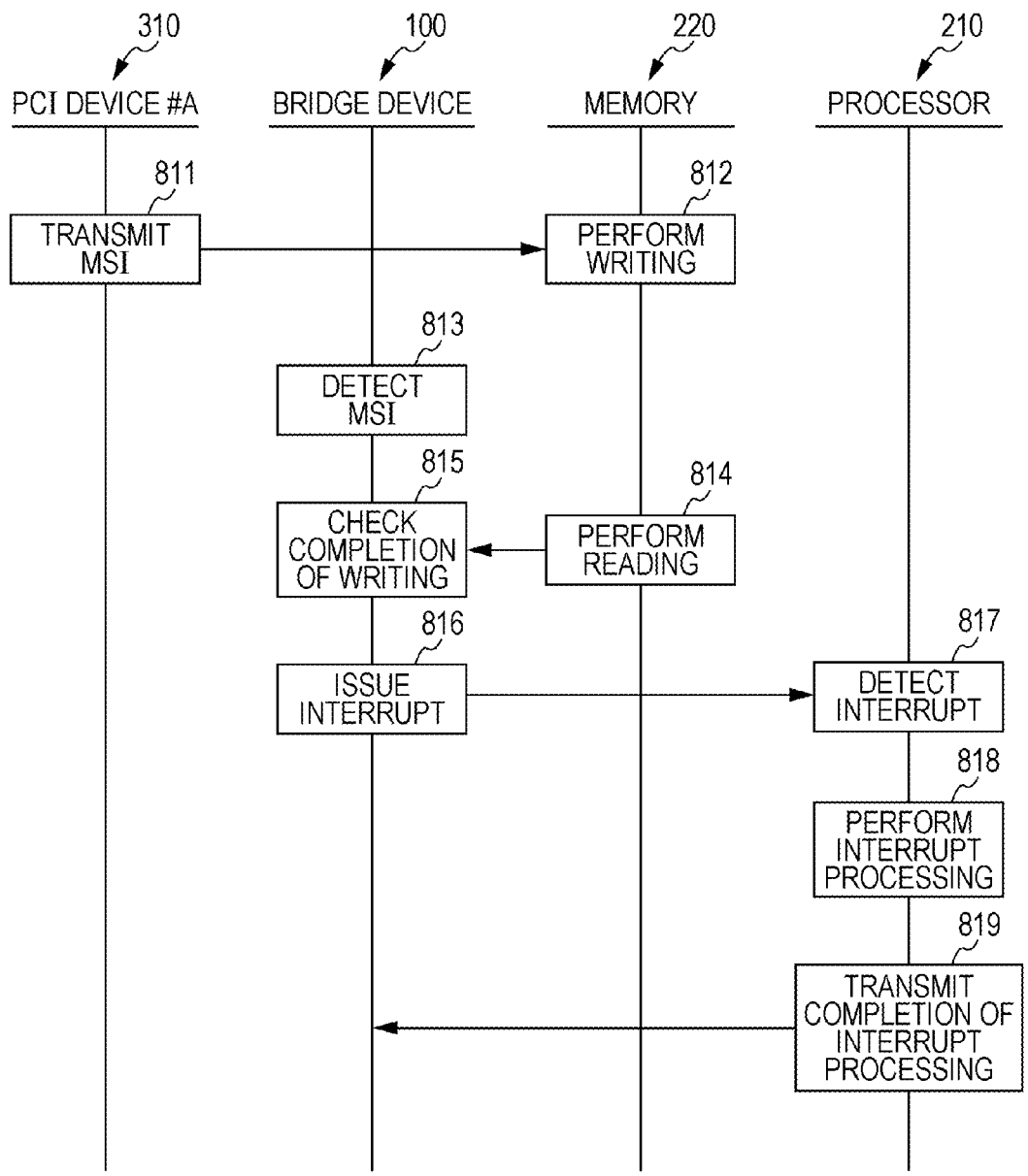
FIG. 9 is a diagram illustrating an example of issuance of a processor interrupt performed in the information processing system according to the first embodiment of the present invention.

FIG. 9 is a diagram illustrating an example of issuance of a processor interrupt performed in the information processing system according to the first embodiment of the present invention. Here, it is assumed that "Processor Interrupt" is set in the interrupt-type-selection register 124.

The PCI device #A 310 transmits an MSI (811) through the PCI bus 190 and the processor bus 290 to the memory 220 where content of the MSI is written (812). The MSI detection unit 110 of the bridge device 100 monitors address information of messages transmitted between the PCI bus 190 and the processor bus 290. Then, the bridge device 100 detects an MSI corresponding to an address region specified by the MSI base address register 121 and the MSI limit address register 122 (813).

Since "Processor Interrupt" has been set in the interrupt-type-selection register 124, the interrupt-issuing-state-management unit 150 of the bridge device 100 reads the MSI from the memory 220 and confirms that the writing operation (812) has been normally completed (815). By this, when processor interrupt processing is performed, the fact that the MSI is stored in the memory 220 is assured. Then, the interrupt issuing unit 160 of the bridge device 100 issues a processor interrupt to the processor 210 (816). Here, information representing "in process" is set in the interrupt in-processing register 125 of the bridge device 100.

When detecting the processor interrupt (817), the processor 210 executes interrupt processing with reference to a data value of the MSI stored in the memory 220 (818). After completion of the interrupt processing, the processor 210 transmits an interrupt-processing completion notification to the bridge device 100 (819). By this, information representing "not in process" is set in the interrupt in-processing register 125 of the bridge device 100.

Figure 10:
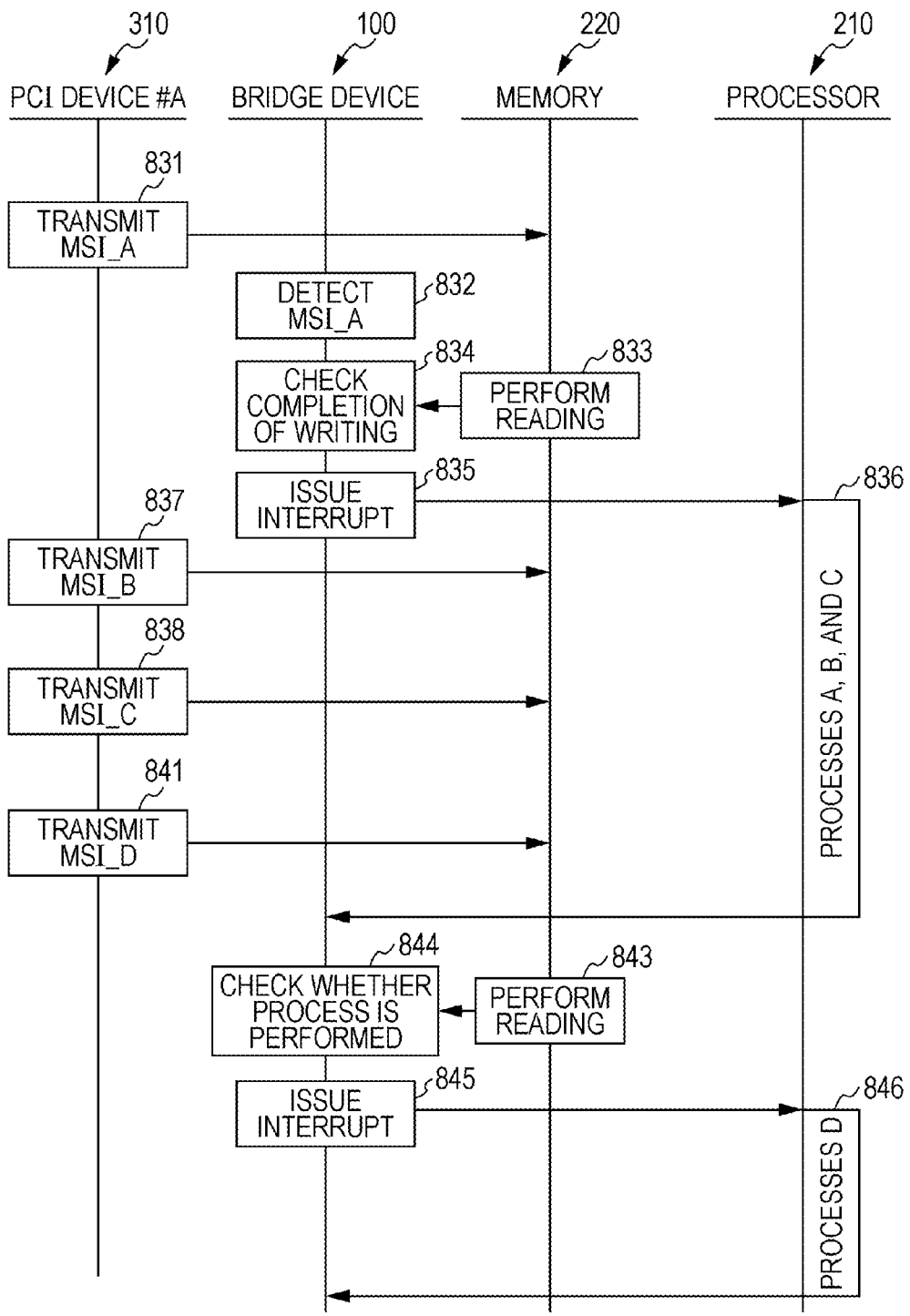
FIG. 10 is a diagram illustrating an example of an operation when a plurality of MSIs are issued in the information processing system according to the first embodiment of the present invention.

FIG. 10 is a diagram illustrating an example of an operation when a plurality of MSIs are issued in the information processing system according to the first embodiment of the present invention. Here, "Processor Interrupt" is set in the interrupt-type-selection register 124.

It is assumed that the PCI device #A 310 transmits four MSI (A to D) (831, 837, 838, and 841). When the MSI detection unit 110 of the bridge device 100 detects an MSI_A (832), the interrupt-issuing-state-management unit 150 of the bridge device 100 reads an MSI (833) from the memory 220 and confirms that a writing operation has been normally completed (834). Then, the interrupt issuing unit 160 of the bridge device 100 issues a processor interrupt to the processor 210 (835). Here, information representing "in process" is set in the interrupt in-processing register 125. While this setting is effective, even if a subsequent MSI is transmitted, a processor interrupt is not issued, and the interrupt-issuing-state-management unit 150 of the bridge device 100 stores information on the latest MSI.

When receiving an instruction representing the processor interrupt, the processor 210 performs interrupt processing (836). The processor 210 clears information on each of MSIs stored in the memory 220 every time an interrupt processing for the MSI is completed. Here, it is assumed that the interrupt processing is performed for three MSI (A to C), and thereafter, interrupt processing completion notifications are transmitted to the bridge device 100. When receiving each of the interrupt processing completion notifications, the bridge device 100 performs a reading operation on the memory 220 (843) and confirms that the latest MSI (MSI_D) is written to the memory 220 (844). Then, the interrupt issuing unit 160 issues a processor interrupt to the processor 210 (845). When receiving an instruction representing the processor interrupt from the bridge device 100, the processor 210 executes interrupt processing (846). When the interruption processing is completed, the processor 210 transmits an interrupt processing completion notification to the bridge device 100.

As described above, in this operation example, by controlling issuance of a processor interrupt so that the processor interrupt is not issued while the interrupt in-processing register 125 indicates "in process", interrupt processing is prevented from being unnecessarily activated. However, in a system in which such control is unnecessary, a processor interrupt may be issued every time an MSI is detected.

Figure 11:
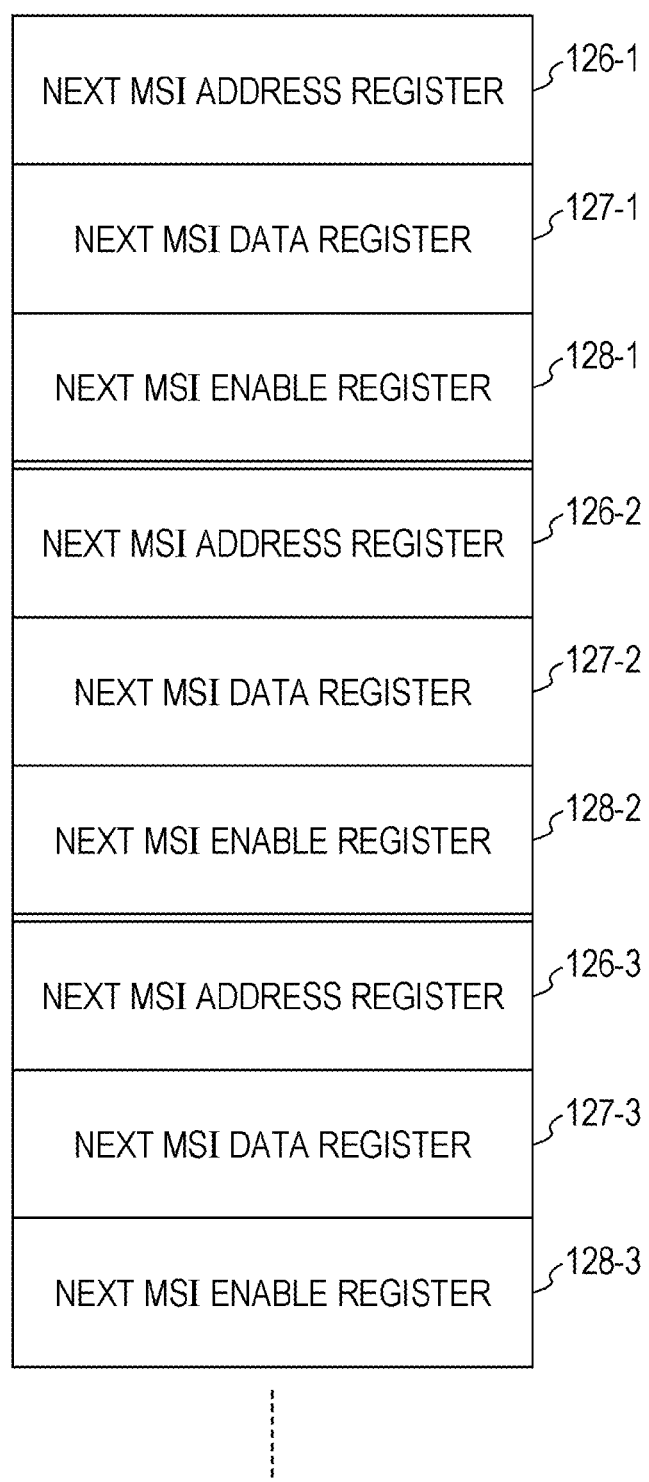
FIG. 11 is a diagram illustrating a configuration example of a portion of a bridge control register according to a modification of the first embodiment of the present invention.

Modification in a Case Where Several MSIs are Issued in Response to MSI Detection FIG. 11 is a diagram illustrating a configuration example of a portion of a bridge control register 120 according to a modification of the first embodiment of the present invention. In this modification, it is assumed that the bridge control register 120 includes a plurality of groups each of which includes a next MSI address registers 126, a next MSI data registers 127, and a next MSI enable registers 128. Note that other registers included in the bridge control register 120 are the same as those shown in FIG. 5.

When an MSI detection unit 110 detects an MSI corresponding to a detection address region, a first group to which the smallest number is assigned, that is, a group including a next MSI address register 126-1, a next MSI data register 127-1, and a next MSI enable register 128-1 is referred to. If the next MSI enable register 128-1 indicates that issuance of the MSI is allowable, the next MSI address register 126-1 is set in a message address 702 (or a message address 701). Then, the next MSI data register 127-1 is set in a message data 703, and the MSI is issued. If the next MSI enable register 128-1 indicates that issuance of the MSI is not allowable, the MSI is not issued.

Subsequently, the interrupt issuing unit 160 refers to a group to which the second smallest number is assigned, that is, a group including a next MSI address register 126-2, a next MSI data register 127-2, and a next MSI enable register 128-2. If the next MSI enable register 128-2 indicates that issuance of the MSI is allowable, the next MSI address register 126-2 is set in the message address 702 (or the message address 701). Then, the next MSI data register 127-2 is set in the message data 703, and the MSI is issued. If the next MSI enable register 128-2 indicates that issuance of the MSI is not allowable, the MSI is not issued.

Subsequently, the interrupt issuing unit 160 refers to a group to which the third smallest number is assigned, that is, a group including a next MSI address register 126-3, a next MSI data register 127-3, and a next MSI enable register 128-3. If the next MSI enable register 128-3 indicates that issuance of the MSI is allowable, the next MSI address register 126-3 is set in the message address 702 (or the message address 701). Then, the next MSI data register 127-3 is set in the message data 703, and the MSI is issued. If the next MSI enable register 128-3 indicates that issuance of the MSI is not allowable, the MSI is not issued.

As described above, the registers are referred to in ascending order of the numbers assigned to the groups so that a plurality of MSIs are successively issued. Although the three groups of registers are employed in this modification, the number of groups of registers is not limited to this.

Figure 12:
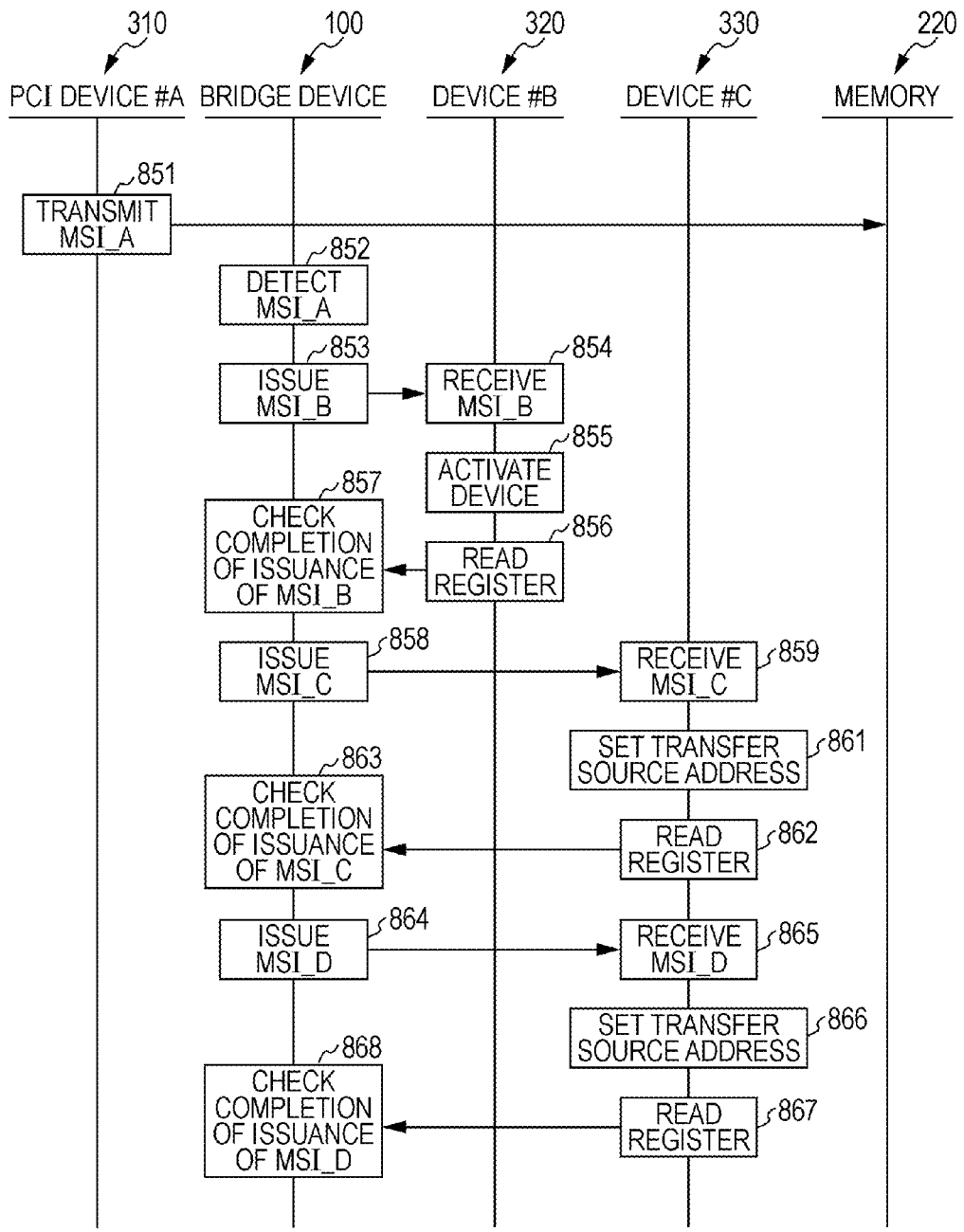
FIG. 12 is a diagram illustrating an example of issuance of a plurality of MSIs performed by the information processing system according to the modification of the first embodiment of the present invention.

FIG. 12 is a diagram illustrating an example of issuance of a plurality of MSIs performed by the information processing system according to the modification of the first embodiment of the present invention. Here, it is assumed that "MSI" is set in the interrupt-type-selection register 124.

A PCI device #A 310 transmits an MSI (851) through a PCI bus 190 and a processor bus 290 to the memory 220 where content of the MSI is written. An MSI detection unit 110 of a bridge device 100 monitors address information of messages transmitted between the PCI bus 190 and the processor bus 290, and detects an MSI corresponding to an address region (852).

Since "MSI" has been set in the interrupt-type-selection register 124, an interrupt-issuing-state-management unit 150 of the bridge device 100 instructs an interrupt issuing unit 160 to issue an MSI. By this, the interrupt issuing unit 160 of the bridge device 100 issues an MSI_B (853). Here, the content of the next MSI address register 126-1 is set in the message address 702 (or the message address 701), and the content of the next MSI data register 127-1 is set in the message data 703.

When an address of the next MSI address register 126-1 indicates a PCI device #B 320, the PCI device #B 320 receives the MSI_B (854). In response to the reception of the MSI_B, the PCI device #B 320 performs activation processing, for example (855). Furthermore, the interrupt issuing unit 160 of the bridge device 100 reads data from a register region included in the PCI device #B 320 (856) to thereby confirm completion of issuance of the MSI_B (857). Note that such processing for confirming the issuance can be eliminated when an access order is assured by a bus function.

Subsequently, the interrupt issuing unit 160 of the bridge device 100 issues an MSI_C (858). Here, the content of the next MSI address register 126-2 is set in the message address 702 (or the message address 701), and the content of the next MSI data register 127-2 is set in the message data 703.

When an address of the next MSI address register 126-2 indicates a PCI device #C 330, the PCI device #C 330 receives the MSI_C (859). It is assumed that the PCI device #C 330 corresponds to a DMA (Direct Memory Access) transmission controlling device. In response to the reception of the MSI_C, an address for DMA transmission is set in the PCI device #C 330, for example (861). Furthermore, the interrupt issuing unit 160 of the bridge device 100 reads data from a register region included in the PCI device #C 330 (862) to thereby confirm completion of issuance of the MSI_C (863).

Subsequently, the interrupt issuing unit 160 of the bridge device 100 issues an MSI_D (864). Here, the content of the next MSI address register 126-3 is set in the message address 702 (or the message address 701), and the content of the next MSI data register 127-3 is set in the message data 703.

When an address of the next MSI address register 126-3 indicates a PCI device #C 330, the PCI device #C 330 receives the MSI_D (865). In response to the reception of the MSI_D, an address for DMA transmission is set in the PCI device #C 330, for example (866). Furthermore, the interrupt issuing unit 160 of the bridge device 100 reads data from the register region included in the PCI device #C 330 (867) to thereby confirm completion of issuance of the MSI_D (868).

Although subsequent processes are omitted in FIG. 12, in the case of DMA transmission, a transmission size is additionally set, and then, start of DMA processing is instructed.

According to this modification, the number of MSIs issued by the bridge device 100 and content thereof can be arbitrarily programmed. This is especially effective in a case where interrupts are instructed to a plurality of processors using MSIs issued by the bridge device 100 or a case where setting for a plurality of registers should be performed in order to activate a device.

Application of the Invention

Figure 13:
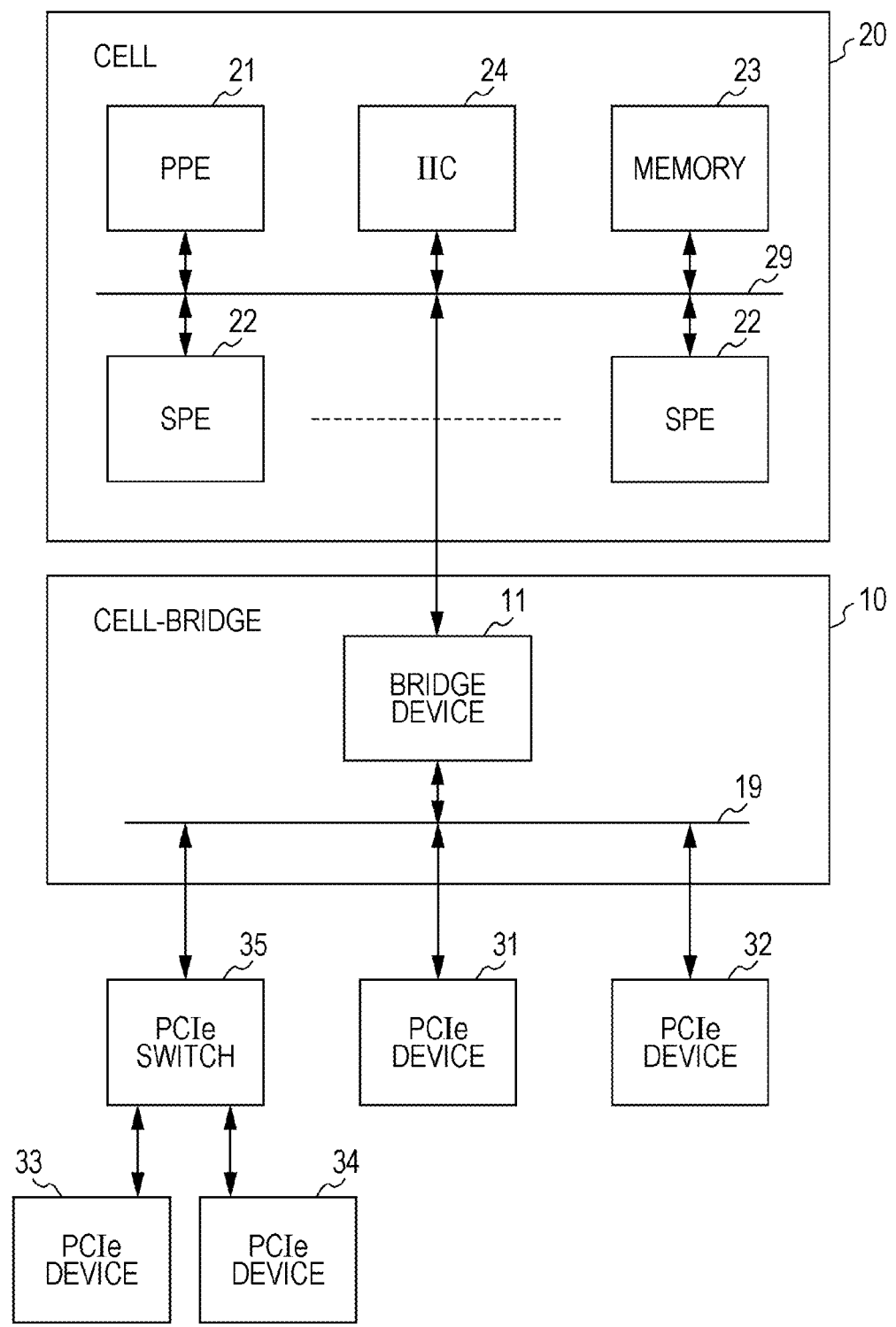
FIG. 13 is a diagram illustrating a concrete example of application of the first embodiment of the present invention.

FIG. 13 is a diagram illustrating a concrete example of application of the first embodiment of the present invention. This example of an information processing system includes a cell (Cell Broadband Engine) 20, a cell bridge 10, PCIe (Peripheral Component Interconnect Express) devices 31 to 34, and a PCIe switch 35.

The cell 20 is a multicore CPU and includes a PPE (PowerPC Processor Element) 21, a plurality of SPEs (Synergistic Processor Elements) 22, a memory 23, and an IIC (Internal Interrupt Controller) 24. The components included in the cell 20 are connected to one another through a processor bus 29. The PPE 21 is a general processor core and mainly used to control the entire cell 20. The SPEs 22 are multiprocessor cores and mainly used to perform calculation. Each of the SPEs 22 includes a local storage. The memory 23 serves as a main storage of the cell 20. The IIC 24 is an internal interrupt controller. The cell 20 corresponds to the processor system 200 described above with reference to FIG. 1. The cell bridge 10 is a bridge system corresponding to the cell 20, and includes a bridge device 11 and a virtual PCI bus 19. The bridge device 11 is connected between the processor bus 29 included in the cell 20 and the virtual PCI bus 19, and enables mutual communication therebetween by changing a packet format and an electric characteristic. The cell bridge 10 corresponds to the bridge device 100 shown FIG. 1. The virtual PCI bus 19 connects the PCIe devices 31 and 32 and the PCIe switch 35 to one another.

The PCIe devices 31 to 34 are peripherals including PCIe interfaces. The PCIe devices 31 to 34 may be connected to the virtual PCI bus 19 included in the cell bridge 10, and may be connected through the PCIe switch 35 in a hierarchical manner. The PCIe switch 35 is used to select one interface for a plurality of PCIe devices.

With this configuration, the bridge device 11 monitors MSIs transmitted from the PCIe devices 31 to 34 to the cell 20. When an MSI corresponding to a detection address region is detected, the bridge device 11 issues a new MSI or a processor interrupt. In the cell 20, the SPE 22 may directly receive an MSI. However, the PPE 21 does not have a function of receiving an MSI. Therefore, after an MSI is written to the memory 23, the bridge device 11 issues an interrupt packet to the IIC 24. When receiving the processor interrupt, the IIC 24 notifies the PPE 21 of the interrupt. Accordingly, the PPE 21 recognizes the MSI written to the memory 23.

Note that, in the processor bus 29 included in the cell 20, an order of writing of an MSI to the memory 23 and writing of an interrupt packet is ensured. Therefore, in this example of the information processing system, confirmation of completion of writing of an MSI may be eliminated.

As described above, according to the first embodiment of the present invention, when the MSI detection unit 110 detects an MSI corresponding to a detection address region, since the interrupt issuing unit 160 issues a new MSI, interrupt processing may be flexibly performed. That is, since a new MSI is transmitted without converting a detected MSI into an interrupt signal, the device is activated at high speed, for example, without interrupt processing performed by the processor. Furthermore, according to the modification, since a plurality of MSIs may be successively issued in response to detection of an MSI, a certain MSI or a certain number of MSIs having certain content may be issued.

Figure 14:
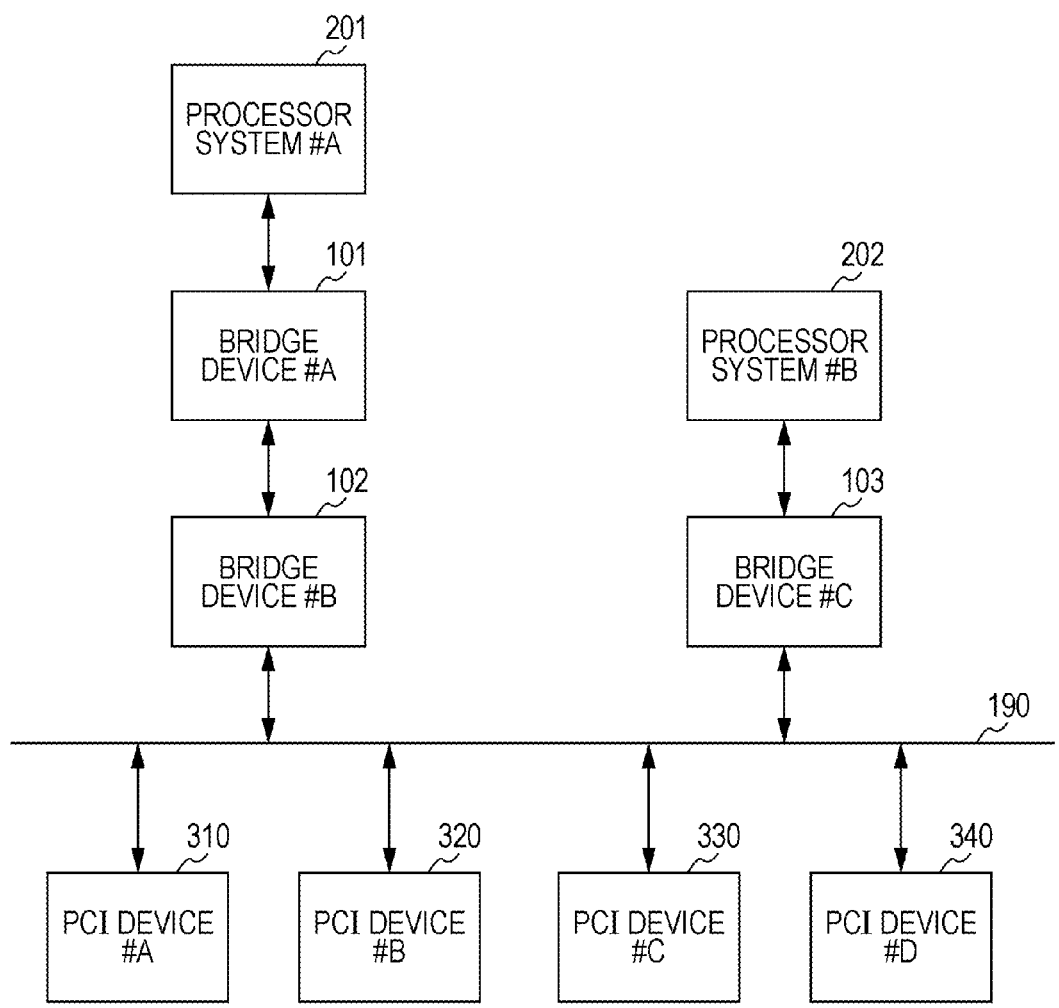
FIG. 14 is a diagram illustrating a configuration example of an information processing system according to a second embodiment of the present invention.

2. Second Embodiment
Example of Information Processing System Including Several Bridge Devices FIG. 14 is a diagram illustrating a configuration example of an information processing system according to a second embodiment of the present invention. The information processing system includes three bridge devices #A 101 to #C 103, two processor systems #A 201 and #B 202, and four PCI devices 310 to 340.

The bridge device #A 101 and the bridge device #B 102 are connected between a PCI bus 190 and the processor system #A 201 in series. Furthermore, the bridge device #C 103 is connected between the PCI bus 190 and the processor system #B 202. In terms of the relationship between the processor systems #A 201 and #B 202 and the PCI bus 190, the bridge devices #A 101 and #B 102 are connected to the bridge device #C 103 in parallel.

In this configuration example, each of the bridge devices #A 101 to #C 103 issues a new MSI in response to detection of an MSI issued from one of the others. Accordingly, MSIs are issued in a chain-reaction manner. Hereinafter, operation in this configuration example will be described.

Figure 15:
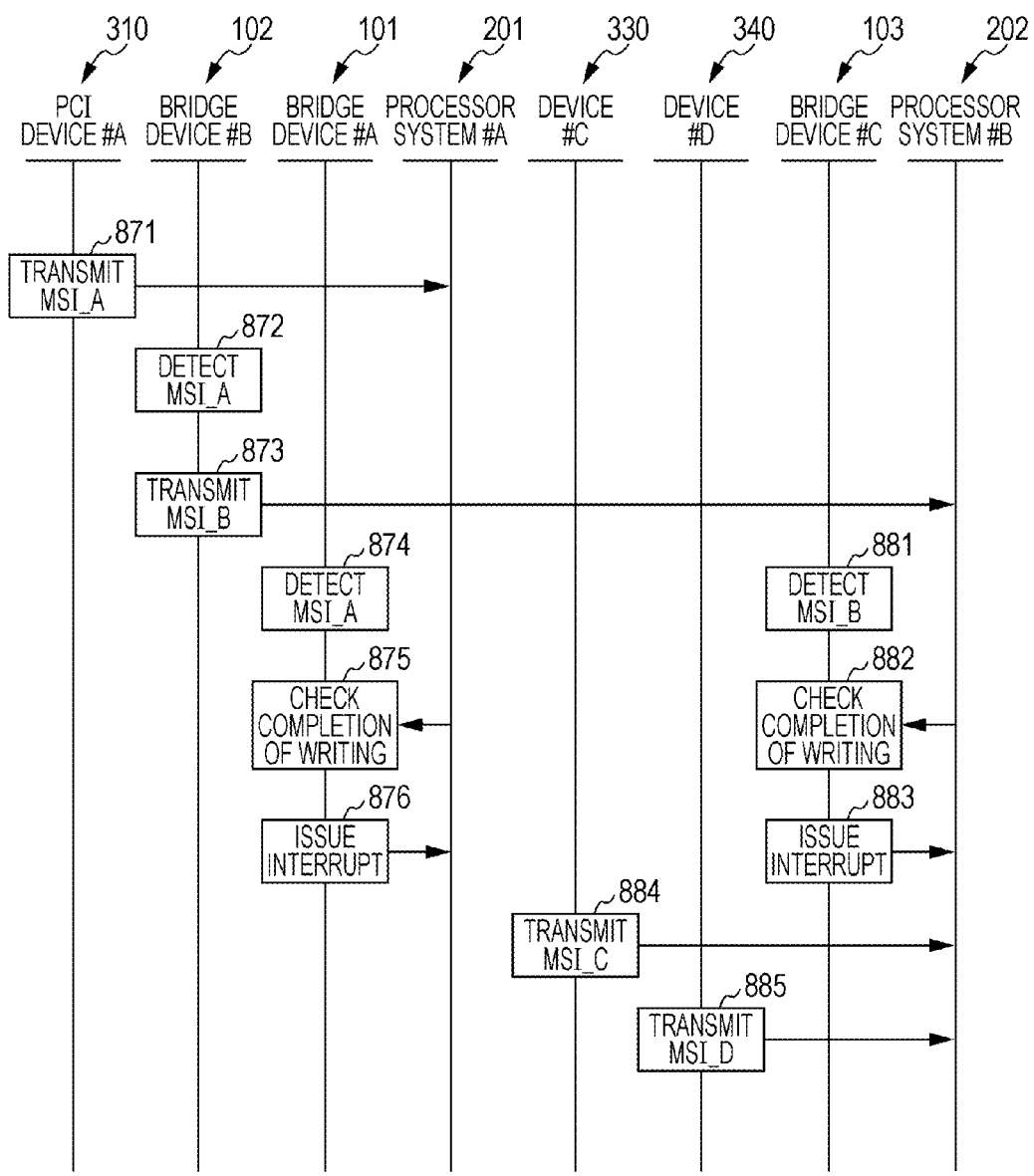
FIG. 15 is a diagram illustrating an example of issuance of an MSI in the information processing system according to the second embodiment of the present invention.

Operation Example of Information Processing System Including Several Bridge Devices FIG. 15 is a diagram illustrating an example of issuance of an MSI in the information processing system according to the second embodiment of the present invention.

When the PCI device #A 310 transmits an MSI_A (871), content of the MSI_A is written in a memory included in the processor system #A 201. MSI detection units 110 included in the bridge devices #A 101 and #B 102 monitor address information of messages transmitted between the PCI bus 190 and the processor system #A 201. Then, the bridge device #B 102 detects an MSI_A corresponding to a detection address region (872). Assuming that "MSI" has been set in an interrupt-type-selection register 124 included in the bridge device #B 102, an interrupt-issuing-state-management unit 150 included in the bridge device #B 102 instructs an interrupt issuing unit 160 to issue an MSI. In this way, the interrupt issuing unit 160 included in the bridge device #B 102 issues an MSI_B to the processor system #B 202 (873).

On the other hand, the bridge device #A 101 also detects the MSI_A corresponding to the detection address region (874). Assuming that "Processor Interrupt" has been set in an interrupt-type-selection register 124 included in the bridge device #A 101, the bridge device #A 101 reads the MSI_A from the memory included in the processor system #A 201 so as to confirm that a writing operation has been normally completed (875). Then, an interrupt issuing unit 160 included in the bridge device #A 101 issues a processor interrupt to the processor system #A 201 (876).

Furthermore, the bridge device #C 103 detects an MSI_B corresponding to the detection address region (881). Assuming that "Processor Interrupt" has been set in an interrupt-type-selection register 124 included in the bridge device #C 103, the bridge device #C 103 reads the MSI_B from a memory included in the processor system #B 202 so as to confirm that a writing operation has been normally completed (882). Then, an interrupt issuing unit 160 included in the bridge device #C 103 issues a processor interrupt to the processor system #B 202 (883). Then, the processor system #B 202 performs interrupt processing.

Thereafter, if the PCI device #C 330 issues an MSI_C and the PCI device #D 340 issues an MSI_D, the processor system #B 202 receives a plurality of MSIs. In this case, processing the same as described with reference to FIG. 10 is performed, and therefore, description thereof is omitted.

As described above, according to the second embodiment of the present invention, MSIs are generated in a chain-reaction manner by detecting MSIs using the plurality of bridge devices #A 101 to #C 103 and issuing new MSIs.

Note that, although, in the foregoing embodiments according to the present invention, a case where the bridge device 100 is connected between the processor bus 290 and the PCI bus 190 is described as an example, the present invention is not limited to this. The bridge device 100 may be inserted in an arbitrary position on a tree of the PCI bus 190.

Furthermore, according to the foregoing embodiments of the present invention, the PCI bus is employed as an example. However, the PCI bus may be replaced by a PCI-X bus or a PCIe bus which has a compatibility with the PCI bus in terms of software. Alternatively, instead of the PCI bus, other arbitrary buses may be used.

Moreover, according to the foregoing embodiments of the present invention, a series of regions specified by the MSI base address register 121 and the MSI limit address register 122 is employed as a detection address region as an example. However, the present invention is not limited to this, and a plurality of address regions may be employed as detection address regions.

Note that the foregoing embodiments of the present invention are merely examples for realizing the present invention. Note that the present invention is not limited to the foregoing embodiments and various modifications may be made within a scope of the invention.

Furthermore, the processing procedures described in the embodiments of the present invention may be recognized as a method including a series of the procedures. Alternatively, the processing procedure may be recognized as a program which causes a computer to execute the series of the procedures or a recording medium which stores the program. Examples of the recording medium include a CD (Compact Disc), an MD (Mini Disc), a DVD (Digital Versatile Disc), a memory card, and a Blu-ray Disc (registered trademark).

The present application contains subject matter related to that disclosed in Japanese Priority Patent Application JP 2008-290438 filed in the Japan Patent Office on Nov. 13, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An interrupt detection apparatus comprising:
   a detection address region storing unit configured to store an address region as a detection address region;
   an issuance interrupt information storing unit configured to store, as issuance interrupt information, second address information of a second interrupt message and a type of the second interrupt message;
   an interrupt message detection unit configured to determine, for a first interrupt message evaluated by the interrupt message detection unit, that first address information of the first interrupt message corresponds to the detection address region; and
   an interrupt issuing unit configured to issue the second interrupt message having the issuance interrupt information when it is determined that the first address information of the first interrupt message corresponds to the detection address region,
   wherein the interrupt issuing unit is configured to issue the second interrupt message via a first bus and a second bus, the interrupt issuing unit being coupled to a processor via the first bus and being coupled to at least one peripheral device via the second bus, and wherein the interrupt issuing unit is configured to issue the second interrupt message via the first bus when the type of the second interrupt message is a first type and is configured to issue the second interrupt message via the second bus when the type of the second interrupt message is a second type different from the first type.

2. The interrupt detection apparatus according to claim 1, wherein the issuance interrupt information storing unit stores a plurality of issuance interrupt information items, and the interrupt issuing unit issues a plurality of second interrupt messages in accordance with the plurality of issuance interrupt information items.

3. An interrupt detection apparatus comprising:

a detection address region storing unit configured to store an address region as a detection address region;

an issuance interrupt information storing unit configured to store, as issuance interrupt information, second address information and second data information of a second interrupt message;

an interrupt message detection unit configured to determine, for a first interrupt message evaluated by the interrupt message detection unit, that first address information of the first interrupt message corresponds to the detection address region;

an interrupt type storing unit configured to store, for the second interrupt message, a type of the second interrupt message, the type being a message-signaled interrupt or a processor interrupt signal to be issued to a processor as a type of an interrupt to be issued; and an interrupt issuing unit configured to issue, when it is determined that the first address information of the first interrupt message corresponds to the detection address region and when the type stored in the interrupt type storing unit corresponds to the message-signaled interrupt, the second interrupt message via a first bus as a message-signaled interrupt message having the issuance address information, and configured to issue, when it is determined that the first address information of the first interrupt message corresponds to the detection address region and when the type stored in the interrupt type storing unit corresponds to the processor interrupt signal, the second interrupt message via a second bus as a processor interrupt signal to the processor.

4. An information processing system comprising:

a processor system having a processor and a memory;

a peripheral device; and a bridge device that connects the processor system and the peripheral device, wherein the bridge device comprises:

a detection address region storing unit configured to store an address region as a detection address region, an issuance interrupt information storing unit configured to store, as issuance interrupt information, second address information of a second interrupt message and a type of the second interrupt message, an interrupt message detection unit configured to determine, for a first interrupt message transmitted by the peripheral device and evaluated by the interrupt message detection unit, that first address information for the first interrupt message corresponds to the detection address region, and an interrupt issuance unit configured to issue the second interrupt message including the issuance interrupt information to the processor system or the peripheral device when it is determined that the first address information of the first interrupt message corresponds to the detection address region, wherein the interrupt issuance unit is configured to issue the second interrupt message via a first bus and a second bus, the interrupt issuance unit being coupled to the processor system via the first bus and being coupled to the peripheral device via the second bus, and wherein the interrupt issuance unit is configured to issue the second interrupt message via the first bus when the type of the second interrupt message is a first type and the second interrupt message is to be sent to the processor system and is configured to issue the second interrupt message via the second bus when the type of the second interrupt message is a second type and the second interrupt message is to be sent to the peripheral device.

5. An information processing system comprising:

at least one processor system having a processor and a memory;

at least one peripheral device; and a plurality of bridge devices that are connected to one another in serial or in parallel between the processor system and the peripheral device, wherein a bridge device of the plurality of bridge devices comprises:

a detection address region storing unit configured to store an address region as a detection address region, an issuance interrupt information storing unit configured to store, as issuance interrupt information, second address information included in a second interrupt message and a type of the second interrupt message, an interrupt message detection unit configured to determine, for a first interrupt message transmitted by the at least one peripheral device and evaluated by the interrupt message detection unit, that first address information of the first interrupt message corresponds to the detection address region, and an interrupt issuance unit configured to issue the second interrupt message having the issuance interrupt information to the processor system or the peripheral device when it is determined that the first address information of the first interrupt message corresponds to the detection address region, wherein the interrupt issuance unit is configured to issue the second interrupt message via a first bus and a second bus, the bridge device being coupled to the at least one processor system via the first bus and being coupled to the at least one peripheral device via the second bus, and wherein the interrupt issuance unit is configured to issue the second interrupt message via the first bus when the type of the second interrupt message is a first type and the second interrupt message is to be sent to the at least one processor system and is configured to issue the second interrupt message via the second bus when the type of the second interrupt message is a second type and the second interrupt message is to be sent to the at least one peripheral device.

* * * * *